(12) United States Patent
Ito

(10) Patent No.: US 12,026,908 B2
(45) Date of Patent: Jul. 2, 2024

(54) IMAGING DEVICE, CONTROL METHOD FOR IMAGING DEVICE, AND NON-TRANSITORY RECORDING MEDIUM

(71) Applicant: Casio Computer Co., Ltd., Tokyo (JP)

(72) Inventor: Takashi Ito, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 120 days.

(21) Appl. No.: 17/687,446

(22) Filed: Mar. 4, 2022

(65) Prior Publication Data
US 2022/0309700 A1    Sep. 29, 2022

(30) Foreign Application Priority Data

Mar. 25, 2021    (JP) ................... 2021-051050

(51) Int. Cl.
| | |
|---|---|
| *G06T 7/70* | (2017.01) |
| *G03B 30/00* | (2021.01) |
| *G06V 20/60* | (2022.01) |
| *H04N 5/235* | (2006.01) |
| *H04N 23/55* | (2023.01) |
| *H04N 23/71* | (2023.01) |
| *G01P 15/18* | (2013.01) |
| *G04G 21/02* | (2010.01) |

(52) U.S. Cl.
CPC ............ *G06T 7/70* (2017.01); *G03B 30/00* (2021.01); *G06V 20/60* (2022.01); *H04N 23/55* (2023.01); *H04N 23/71* (2023.01); *G01P 15/18* (2013.01); *G04G 21/02* (2013.01); *G06T 2207/10152* (2013.01); *G06V 2201/07* (2022.01)

(58) Field of Classification Search
CPC . G06T 7/70; G06T 2207/10152; H04N 23/51; G06V 20/60; G06V 2201/07; G03B 30/00
See application file for complete search history.

(56) References Cited

U.S. PATENT DOCUMENTS

2022/0368825 A1*  11/2022  Ouchi .................. H04N 23/69

FOREIGN PATENT DOCUMENTS

| JP | 2003-244294 A | 8/2003 |
|---|---|---|
| JP | 2008-289039 A | 11/2008 |

(Continued)

OTHER PUBLICATIONS

Office Action, dated Jul. 26, 2022, for Japanese Patent Application No. 2021-051050. (10 pages) (with English Translation).

*Primary Examiner* — William C Vaughn, Jr.
*Assistant Examiner* — Naod W Belai
(74) *Attorney, Agent, or Firm* — Seed IP Law Group LLP

(57) ABSTRACT

An imaging device includes a lens that guides, to an imaging element, light reflected from a subject, a wearing tool for wearing at least the lens on a wearing target, and at least one processor. The processor determines whether a first condition based on a positional relationship of the lens with respect to the wearing target is satisfied, determines whether a second condition that includes a condition based on the positional relationship of the lens with respect to the wearing target is satisfied, the second condition differing from the first condition, and makes an imaging parameter of at least one of the imaging element or the lens for when the first condition is satisfied and for when the second condition is satisfied different from each other.

20 Claims, 8 Drawing Sheets

(56) References Cited

FOREIGN PATENT DOCUMENTS

| | | |
|---|---|---|
| JP | 2009-111843 A | 5/2009 |
| JP | 2012-211922 A | 11/2012 |
| JP | 2019-200801 A | 11/2019 |
| WO | 2019/124056 A1 | 6/2019 |

* cited by examiner

IMAGING DEVICE, CONTROL METHOD FOR IMAGING DEVICE, AND NON-TRANSITORY RECORDING MEDIUM

CROSS-REFERENCE TO RELATED APPLICATION

This application claims the benefit of Japanese Patent Application No. 2021-051050, filed on Mar. 25, 2021, the entire disclosure of which is incorporated by reference herein.

FIELD

This application relates to an imaging device, a control method for the imaging device, and a non-transitory recording medium.

BACKGROUND

Imaging devices that can be worn on human bodies are known in the related art. For example, Unexamined Japanese Patent Application Publication No. 2003-244294 describes a wristwatch-type electronic device having a built-in camera. This device can rotate the orientation of the camera in various directions thereabout while being worn on the wrist.

SUMMARY

An aspect of an imaging device according to the present disclosure that achieves the objective described above includes:
  a lens that guides, to an imaging element, light reflected from a subject;
  a wearing tool for wearing at least the lens on a wearing target; and
  at least one processor configured to
    determine whether a first condition based on a positional relationship of the lens with respect to the wearing target is satisfied,
    determine whether a second condition that includes a condition based on the positional relationship of the lens with respect to the wearing target is satisfied, the second condition differing from the first condition, and
    make an imaging parameter of at least one of the imaging element or the lens for when the first condition is satisfied and for when the second condition is satisfied different from each other.

BRIEF DESCRIPTION OF THE DRAWINGS

A more complete understanding of this application can be obtained when the following detailed description is considered in conjunction with the following drawings, in which.

DETAILED DESCRIPTION

Figure 1:
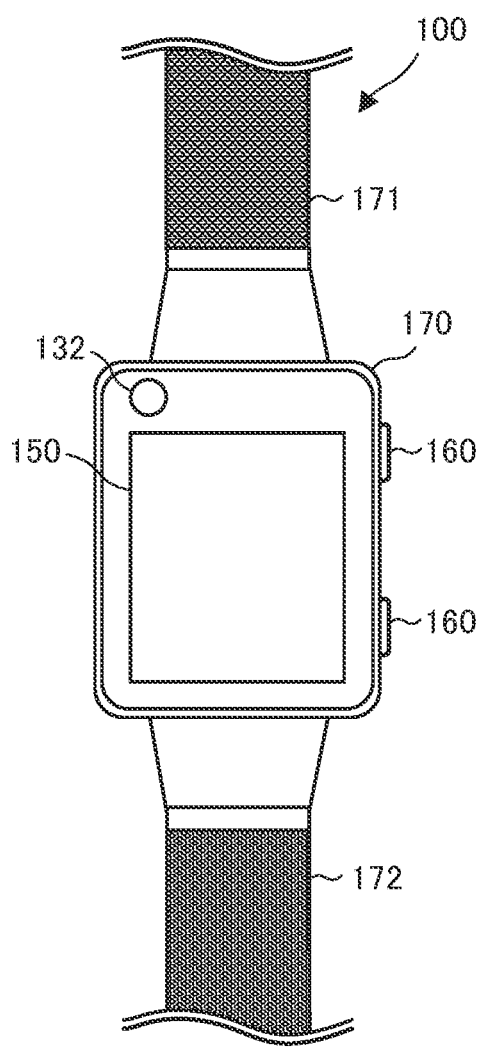
FIG. 1 is a front view of an imaging device according to an embodiment.

Hereinafter, an imaging device according to various embodiments is described while referencing the drawings. Note that, in the drawings, identical or corresponding components are denoted with the same reference numerals.

Embodiments

Figure 2:
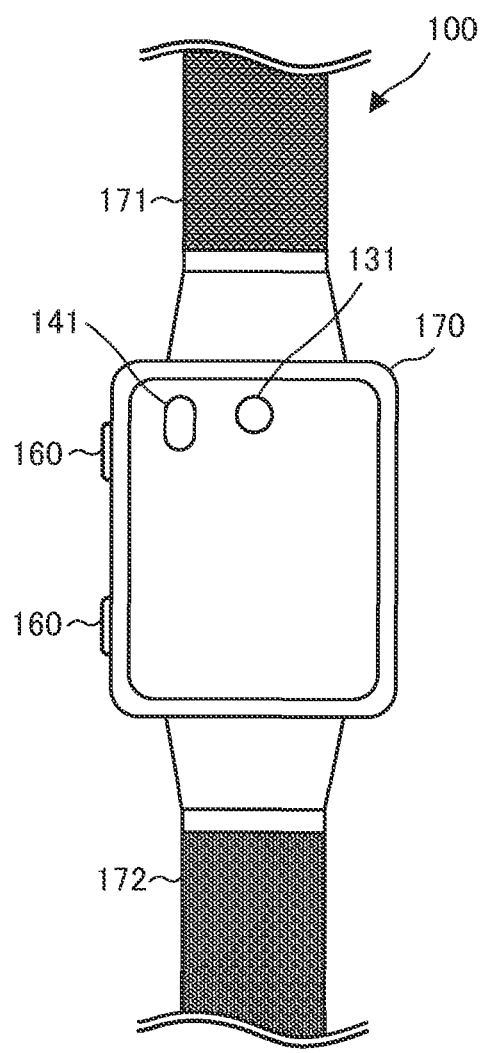
FIG. 2 is a back view of the imaging device according to the embodiment.

As illustrated in FIG. 1, an imaging device 100 according to an embodiment is a wristwatch-type device that includes a main body 170, and a display 150 and a front camera 132 (second camera) on a front side of the main body 170. Additionally, as illustrated in FIG. 2, the imaging device 100 includes, on a back side of the main body 170, an illuminance sensor 141 and a rear camera 131 (first camera). Moreover, the imaging device 100 includes bands 171, 172 as a wearing tool for wearing the main body 170, that includes the rear camera 131, the front camera 132, and the like, on an arm (typically the wrist of the left arm), that is a wearing target, of the user. The band 171 is connected to an upper end of the main body 170, and the band 172 is connected to a lower end of the main body 170. Additionally, the imaging device 100 includes, on a side surface of the main body 170, a push button as an operator 160.

When the user wears the imaging device 100 on the wrist using the bands 171, 172, a lens of the rear camera 131 and the illuminance sensor 141 are brought close to the wrist, and light is prevented from entering the rear camera 131 and the illuminance sensor 141 from outside. When the imaging device 100 is removed from the wrist, the bands 171, 172 are imaged by setting an angle of view set to a wide angle and performing imaging using the rear camera 131. That is, the bands 171, 172 are connected to the main body 170 so as to extend to the back surface side of the imaging device 100.

Figure 3:
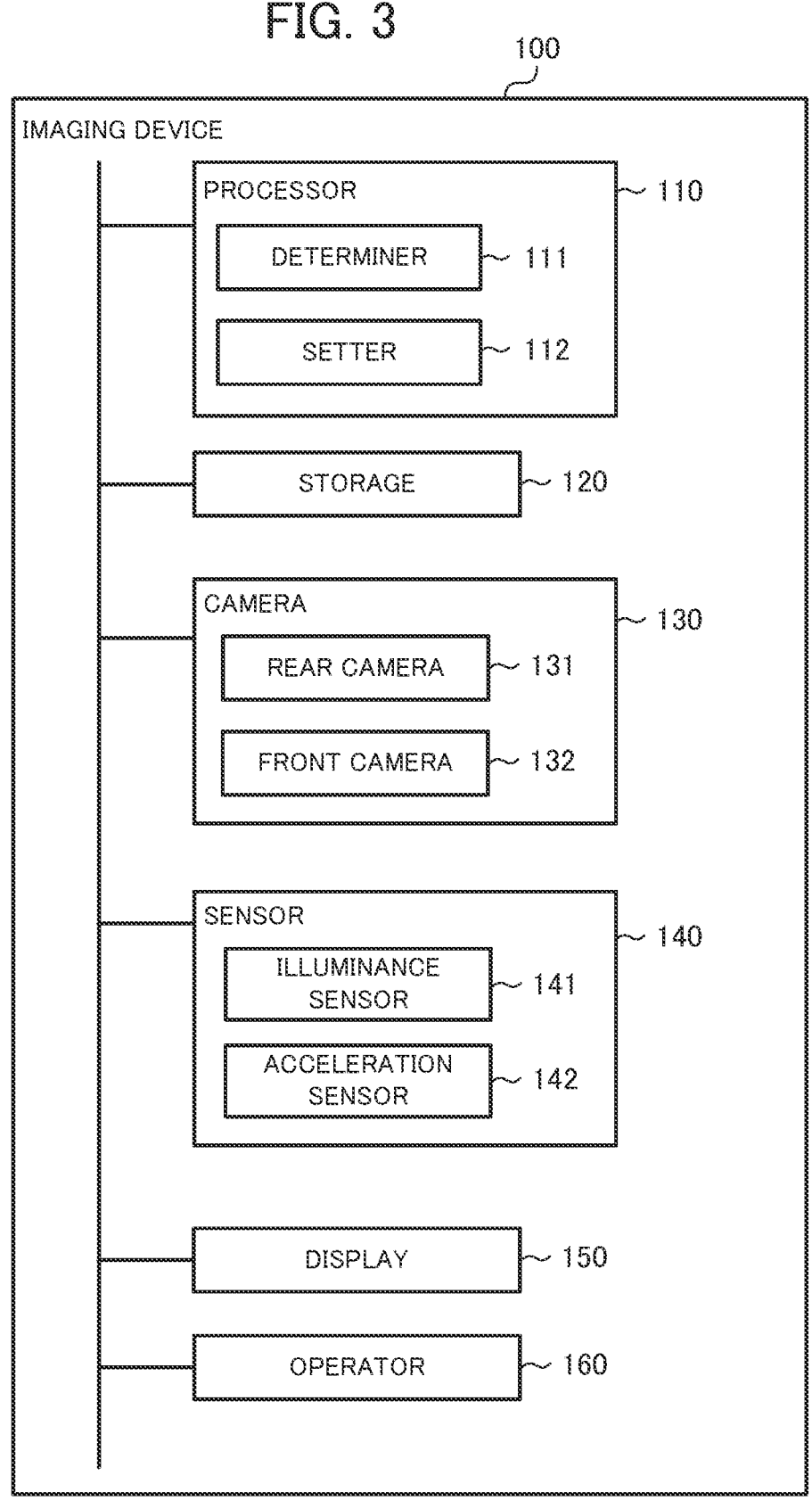
FIG. 3 is a block diagram illustrating the functional configuration of the imaging device according to the embodiment.

As illustrated in FIG. 3, the imaging device 100 includes, as the functional configuration thereof, at least one processor 110, a storage 120, a camera 130, a sensor 140, a display 150, and an operator 160.

In one example, the processor 110 is configured from a processor such as a central processing unit (CPU) or the like. The processor 110 functions as the hereinafter described various components (a determiner 111 and a setter 112) by executing programs stored in the storage unit 120. Note that the processor 110 is compatible with multithreading functionality, in which a plurality of processes are executed in parallel, and is provided with a function that counts time using a real time clock (RTC) or the like.

The storage 120 stores the programs to be executed by the processor 110 and necessary data. The storage 120 may include random access memory (RAM), read-only memory (ROM), flash memory, or the like, but is not limited thereto. Note that the storage 120 may be provided inside the processor 110.

The camera 130 includes the rear camera 131 and the front camera 132. The rear camera 131 and the front camera 132 each include an imaging element and a lens that guides, to the imaging element, light reflected from a subject. Specifically, the rear camera 131 includes a first imaging element and a first lens, and the front camera 132 includes a second imaging element and a second lens. The imaging element is implemented as, for example, a charge coupled device (CCD) image sensor, a complementary metal oxide semiconductor (CMOS) image sensor, or the like. The camera captures an image by receiving, on the imaging element, the light reflected from the imaging target (the subject) that has passed through the lens, and converting that light to an electronic signal. Note that, in the present embodiment, the camera 130 includes the rear camera 131 and the front camera 132, but a configuration is possible in which the camera 130 includes only the rear camera 131 or includes three or more cameras.

The sensor 140 includes the illuminance sensor 141 and an acceleration sensor 142. The illuminance sensor 141 includes a light receiving element such as a photodiode or the like, and detects ambient brightness (illuminance). The acceleration sensor 142 detects acceleration on each of three axes that are orthogonal to each other (for example, a vertical direction axis, a front-back direction axis, and a left-right direction axis). Note that a configuration is possible in which the sensor 140 further includes other sensors such as a pulse sensor and the like.

The lens of the rear camera 131 is provided so as to be positioned at a position (first position) covered by the wrist while being worn on the wrist by the bands 171, 172. Moreover, the lens of the rear camera 131 is provided at a position where the illuminance sensor 141 is also covered by the wrist while being worn on the wrist by the bands 171, 172.

The display 150 includes a display device such as a liquid crystal display, an organic electro-luminescence (EL) display, or the like, and displays images captured by the camera 130, the current time, and the like.

The operator 160 is a user interface such as a push button switch or the like, and receives operations/inputs from the user. In one example, the imaging device 100 includes, as the operator 160, an imaging button, a mode switching button, and the like. In the imaging device 100, imaging by the rear camera 131 requires that imaging control processing (described later) be performed, but imaging by the front camera 132 can be performed at any time by the user pressing the imaging button. Note that a configuration is possible in which imaging by the rear camera 131 can be performed at any time by the user pressing the imaging button.

Next, the functional configuration of the processor 110 is described. As described above, the processor 110 functions as a determiner 111 and a setter 112.

In the imaging control processing (described later), the determiner 111 determines whether a condition, based on the positional relationship of the camera (the rear camera 131) with respect to the wearing target (the wrist of the user), is satisfied.

The setter 112 sets imaging parameters (for example, angle of view, sensitivity, and the like) of the camera (the imaging element and/or the lens) in accordance with whether the condition determined by the determiner 111 is satisfied.

Figure 4:
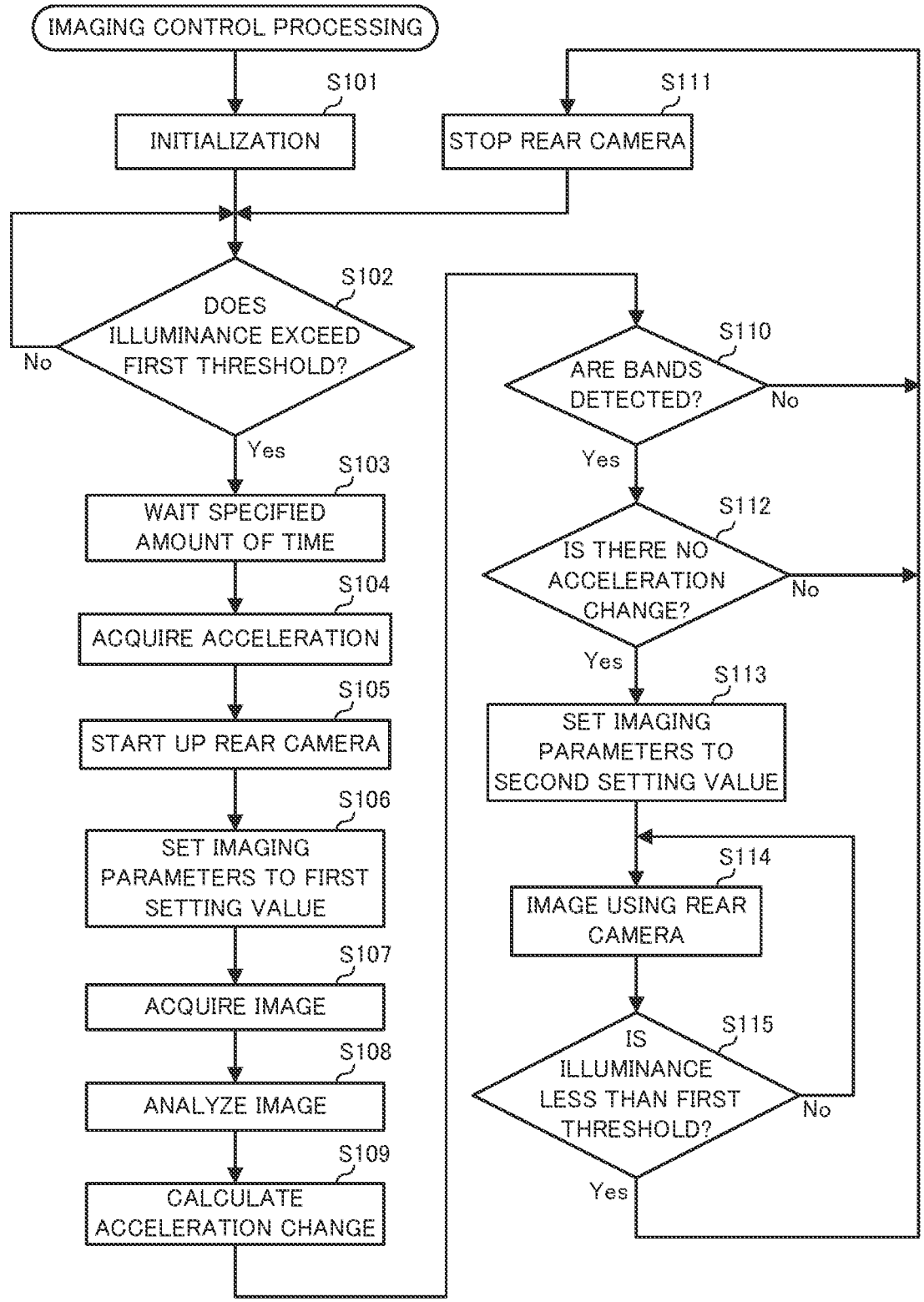
FIG. 4 is a flowchart of imaging control processing according to the embodiment.

Next, the imaging control processing executed by the processor 110 is described while referencing FIG. 4. The imaging device 100 starts the imaging control processing automatically when the power is turned ON or on the basis of an operation of the user.

Firstly, the processor 110 performs initialization processing (step S101). Specifically, in one example, the processor stops the driving of the imaging element of the rear camera 131, and starts up the illuminance sensor 141.

Next, the processor 110 (the determiner 111) determines whether a condition (first condition), that the illuminance (ambient brightness) detected by the illuminance sensor 141 exceeds a first threshold, is satisfied (step S102). Note that this first threshold is a value defined as the minimum brightness at which it is possible to image the bands 171, 172 when the camera is set to a high sensitivity mode. Additionally, this first condition is satisfied when (the lens of) the rear camera 131 is removed from the wrist when surroundings are bright (when external light that was blocked by the wrist enters the illuminance sensor 141). Therefore, the first condition is a condition that is based on the positional relationship of (the lens) of the rear camera 131 with respect to the wrist.

When the illuminance does not exceed the first threshold (step S102; No), the processor 110 determines that the rear camera 131 is being worn on the wrist (light is blocked from entering the illuminance sensor 141 by the wrist), and executes step S102.

When the illuminance exceeds the first threshold (step S102; Yes), the processor 110 provisionally determines that the rear camera 131 is removed from the wrist, and waits a specified amount of time (for example, three seconds) (step S103). This waiting is provided because it is thought that an approximate amount of time T is needed for the user to remove the imaging device 100 from the wrist and place the imaging device 100 at another location. Therefore, the value of the specific amount of time is set as an amount of time corresponding to the amount of time T+α.

Then, the processor 110 acquires a value of acceleration detected by the acceleration sensor 142 (step S104), and starts up the imaging element of the rear camera 131 (step S105).

Next, the processor 110 (the setter 112) sets the imaging parameters of the rear camera 131 to a first setting value (step S106). The first setting value is a setting value at which it is possible for the lens and the imaging element of the rear camera 131 to image the bands 171. 172. More specifically, the first setting value is a setting value for setting the angle of view of the lens of the rear camera 131 to a wide angle (first angle of view value greater than or equal to a wide angle reference angle of view value (for example 60 degrees)), and the sensitivity of the imaging element of the rear camera 131 to a high sensitivity mode (for example ISO sensitivity 3200).

Figure 5:
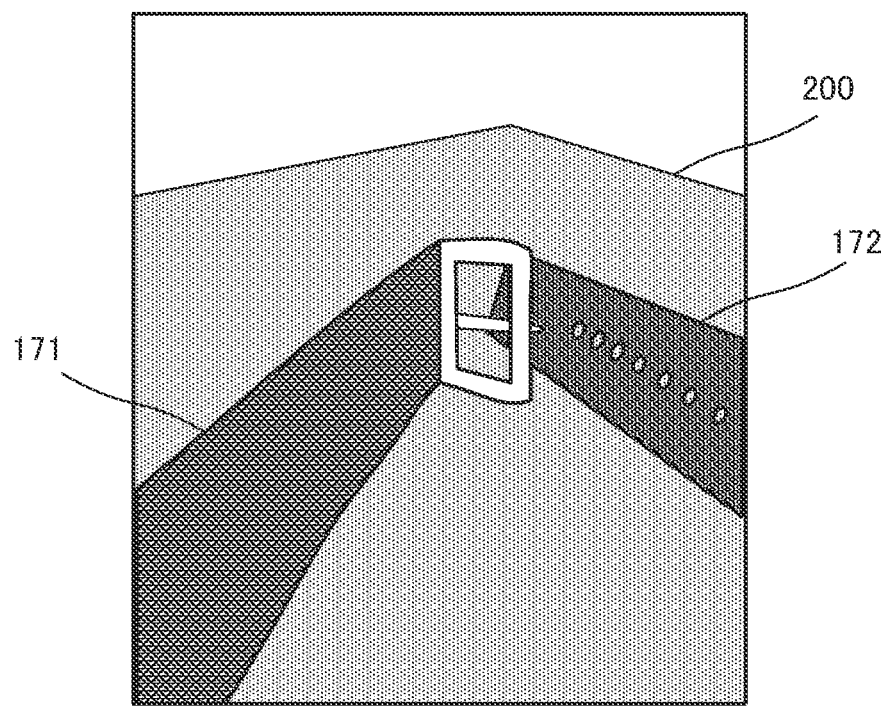
FIG. 5 is a drawing illustrating an example of an image obtained by imaging a band using the imaging device according to the embodiment.

Then, the processor 110 acquires an image captured by the rear camera 131 in which the imaging parameters are set to the first setting value (step S107), and performs image analysis for detecting whether the bands 171, 172 are captured in that image (step S108). When the imaging device 100 is removed from the wrist, as illustrated in FIG. 5, the bands 171, 172 appear in the image captured by the rear camera 131 in which the imaging parameters are set to the first setting value. Therefore, when the processor 110 detects, by the image analysis, that the bands 171, 172 appear in the image, the processor 110 can confirm the determination that the rear camera 131 is removed from the wrist. Note that FIG. 5 illustrates an example of a case in which the imaging device 100 is removed from the wrist and placed on a desk 200. However, even if the imaging device 100 is not placed on the desk 200 when removing the imaging device 100 from the wrist, the bands 171, 172 appear in the image captured by the rear camera 131 in which the imaging parameters are set to the first setting value, as described above.

Returning to FIG. 4, the processor 110 acquires a value of acceleration detected by the acceleration sensor 142, and calculates the difference between the value of acceleration acquired here and the value of acceleration acquired in step S104 to calculate a value of acceleration change (step S109). Note that, when the elapsed time from when the value of the acceleration is acquired in step S104 is short, the processor 110 may, in step S109, acquire the value of acceleration after waiting a certain amount of time to calculate the value of acceleration change. This is because, when the value of acceleration is acquired two times at rather short time intervals, the calculated value of acceleration change may be unstable.

Next, the processor 110 (the determiner 111) determines whether a condition (second condition) that the bands 171, 172 are detected using the image analysis of step S108 is satisfied (step S110). This second condition is satisfied when the determination that (the lens of) the rear camera 131 is removed from the wrist is confirmed on the basis of the image captured by the rear camera 131 in which the imaging parameters are set to the first setting value. Therefore, the second condition is a condition based on the positional relationship of (the lens of) the rear camera 131 with respect to the wrist. When the bands 171, 172 are not detected (step S110; No), a determination is made that the imaging device 100 is being worn on the wrist (for example, a gap has formed between the imaging device 100 and the wrist, ambient light has entered the illuminance sensor 141 through that gap, and a determination of Yes is made in step S102), and the processor 110 stops the driving of the imaging element of the rear camera 131 (step S111) and executes step S102.

Examples of cases in which a determination of No is made in step S110 include not only cases in which a gap is formed between the imaging device 100 and the wrist, but also cases in which the bands are not correctly imaged due to blurring, cases in which the user is holding the imaging device 100 so that the bands are not imaged by the rear camera 131, and the like. In such cases, it is thought that repeating the imaging multiple times until the bands are imaged is effective. Therefore, a configuration is possible in which, when a determination of No is made in step S110, step S106 is returned to without stopping the driving of the imaging element of the rear camera 131. Moreover, a configuration is possible in which a number of times that the processing of returning to step S106 form step S110 (No determination) is consecutively performed is counted and, when a count value thereof reaches a predetermined value (for example, ten), a malfunction is determined and step S101 is executed.

When the bands 171, 172 are detected (step S110; Yes), the processor 110 confirms the determination that the rear camera 131 is removed from wrist. Then, the processor 110 determines if there is no acceleration change, that is, if the value of acceleration calculated in step S109 is less than an acceleration change threshold (step S112). Note that the value of the acceleration change threshold is set in advance to a value that is slightly less than the value of acceleration change expected to be calculated when the imaging device 100 is being worn on the wrist. By setting the acceleration change threshold in this manner, it is possible to determine that the imaging device 100 is placed on a desk or the like when the value of acceleration change is less than the acceleration change threshold.

When the value of acceleration change exceeds the acceleration change threshold (step S112; No), a determination is made that the imaging device 100 is removed from the wrist but is being carried by the user in a pocket, a bag, or the like, and the processor 110 stops the driving of the imaging element of the rear camera 131 (step S111) and executes step S102.

When the value of acceleration change is less than the acceleration change threshold (step S112; Yes), the processor 110 (the setter 112) sets the imaging parameters of the rear camera 131 to a second setting value (step S113). The second setting value is a setting value defined on the basis of the content imaged by the rear camera 131 (for example, landscape imaging, surveillance imaging, or the like). A second setting value is selected that sets the angle of view to an angle of view narrower than the wide angle (a second angle of view value that is less than the wide angle reference angle of view value; for example, normal or telephoto), and the sensitivity to an optimal setting value corresponding to the ambient brightness In the case of surveillance imaging, the imaging device 100 can continuously perform surveillance with low power consumption and low memory usage by setting a setting value in which the frame rate is reduced.

Next, the processor 110 performs imaging using the rear camera 131 (step S114). In this step, imaging of content that the user desires to image using the rear camera 131, such as landscape imaging, surveillance imaging, or the like, is performed.

Then, the processor 110 determines whether the illuminance (ambient brightness) detected by the illuminance sensor 141 is less than the first threshold (step S115). When the illuminance exceeds the first threshold (step S115; No), step S114 is executed.

When the illuminance is less than the first threshold (step S115; Yes), a determination is made that the imaging device 100 is worn again on the wrist (light entering into the illuminance sensor 141 is blocked by the wrist), and the processor 110 stops the driving of the imaging element of the rear camera 131 (step S111) and executes step S102. Note that, in step S115, the processor 110 determines the re-wearing of the imaging device 100 on the basis of the illuminance detected by the illuminance sensor 141 and, due to this, can perform the determination of the re-wearing without performing image processing such as in step S108. As such, the load on the processor 110 can be reduced. Additionally, the angle of view of the rear camera 131 is narrowed in step S113 and, as a result, the possibility of the bands 171, 172 not appearing in the image captured in step S114 is high. However, in step S115, the processor 110 performs the determination on the basis of the illuminance and, thus, can determine the re-wearing of the imaging device 100 even when the bands 171, 172 do not appear in the captured image.

By carrying out the imaging control processing described above, the imaging device 100 can appropriately perform imaging in accordance with a condition based on the position of the rear camera 131. Specifically, when the imaging device 100 is being worn on the wrist, the processor 110 stops the driving of the imaging element of the rear camera 131. Moreover, when the first condition is satisfied due to a provisional determination being made that the imaging device 100 is removed from the wrist, the processor 110 sets the angle of view of the rear camera 131 to a wide angle, performs imaging, and attempts detection of the bands 171, 172. When the bands 171, 172 are detected and, thus, the second condition is satisfied by confirming the determination that the imaging device 100 is removed from the wrist, the angle of view of the rear camera 131 can be changed and landscape imaging, surveillance imaging, or the like can be performed.

In the present embodiment, the sensor 140 includes the illuminance sensor 141 and, in steps S102 and S115 of the imaging control processing, the processor 110 determines whether the ambient brightness detected by the illuminance sensor 141 is less than the first threshold. Since the power consumption of the illuminance sensor 141 is less than the power consumption of the rear camera 131, the imaging device 100 can determine the ambient brightness at lower power consumption by using the illuminance sensor 141. Additionally, when the ambient brightness is low and imaging by the rear camera 131 is not possible, the driving of the imaging element of the rear camera 131 can be stopped to reduce power consumption.

A configuration is possible in which the imaging device 100 does not include the illuminance sensor 141. In such a case, the ambient brightness is detected by imaging using the rear camera 131 in steps S102 and S115 of the imaging control processing. To realize this, in the imaging control processing of an imaging device 100 that does not include the illuminance sensor 141, in steps S101 and S111, the driving of the imaging element of the rear camera 131 is not stopped, and imaging parameters such as opening the aperture or the like are set whereby the ambient brightness can be easily detected.

In the present embodiment, the sensor 140 includes the acceleration sensor 142, and the presence/absence of an acceleration change is determined in step S112 of the imaging control processing. As such, when the imaging device 100 is removed from the wrist and is placed in a pocket, a bag, or the like, a determination can be made that imaging using the rear camera 131 is unnecessary and the driving of the imaging element of the rear camera 131 can be stopped, thereby preventing unnecessary imaging from being performed in the pocket, in the bag, or the like. As a result, the power consumption of the imaging device 100 can be reduced.

A configuration is possible in which the imaging device 100 does not include the acceleration sensor 142. In such a case, the processing of steps S104, S109, and S112 of the imaging control processing can be omitted and, when a determination of Yes is made in step S110, step S113 is executed. In such a case, when a determination is made that the imaging device 100 is removed from the wrist, imaging using the rear camera 131 is performed, regardless of whether there is an acceleration change.

In the embodiment described above, the rear camera 131 is controlled in the imaging control processing, but a configuration is possible in which the front camera 132 is also controlled. For example, a configuration is possible in which, when a determination is made that the imaging device 100 is being worn on the wrist, the imaging parameters of the front camera 132 are set to a setting value (front first setting value) for imaging the face of the user (self imaging), performing imaging for authentication, or the like and, when a determination is made that the imaging device 100 is removed from the wrist, the imaging parameters of the front camera 132 are set to a setting value (front second setting value) for landscape imaging, surveillance imaging, or the like. For the front first setting value, as, for example, a setting value for self imaging, a setting value is possible that sets the angle of view of the front camera 132 to a wide angle (an angle of view value greater than or equal to the wide angle reference angle of view value; for example, an angle of view setting value whereby the front camera 132 is focused on the face when the front camera 132 is positioned in front of the face of the user) and the sensitivity to a middle sensitivity mode (since the image quality increases as the sensitivity is reduced, ISO sensitivity 400, for example). This setting value enables high quality imaging of the face of the user at a short distance.

Additionally, a setting value for authentication is possible for the first front setting value. Examples thereof include a setting value for iris authentication (a macro angle of view setting value whereby the front camera 132 is focused on the iris when the front camera 132 is positioned in front of an eyeball of the user), a setting value for face authentication (a setting value similar to the setting value for self imaging), a setting value for fingerprint authentication (a macro angle of view setting value whereby the front camera 132 is focused on a fingerprint when the front camera 132 is positioned in front of a finger or the like for fingerprint authentication), and the like. Examples of the front second setting value include a setting value that sets the angle of view of the front camera 132 to telephoto (an angle of view less than the telephoto reference angle of view (for example, 30 degrees)) and the sensitivity to a middle sensitivity mode (ISO sensitivity 400, for example) to zoom in on a distant landscape and enable high quality imaging, a setting value that sets the angle of view of the front camera 132 to an ultra-wide angle of view (an angle of view value greater than or equal to an ultra-wide angle reference angle of view value (for example, 100 degrees)) and the sensitivity to a high sensitivity mode (for example, ISO sensitivity 3200) to perform surveillance, and the like.

To realize this, it is sufficient that, in steps S101 and S111 of the imaging control processing, processing is performed for setting the imaging parameters of the front camera 132 to the front first setting value (thereby setting the setting value for when imaging using the front camera 132 is performed by pressing the imaging button of the operator 160), in step S113, processing is performed for setting the imaging parameters of the front camera 132 to the front second setting value and, in step S114, processing is also performed for imaging using the front camera 132. As a result, the front camera 132 can appropriately perform imaging in accordance with a condition based on the position of the lens. For example, the front camera 132 is set to self imaging mode when the imaging device 100 is being worn on the wrist, and is set to surveillance camera mode when removed from the wrist.

A configuration is possible in which, as the imaging parameters for when the imaging device 100 is removed from the wrist, the setting value for the rear camera 131 (second setting value) and the setting value for the front camera 132 (front second setting value) are both set to the same ultra-wide angle (180 degree angle of view) fisheye lens imaging mode. Configuring in this manner makes it possible to capture a 360-degree omnidirectional image using the two cameras.

Note that it is sufficient that at least a portion of the imaging range of the rear camera 131 and the imaging range of the front camera 132 differ, and a portion of the imaging ranges may overlap. For example, a portion of the imaging ranges can be caused to overlap by using a fisheye lens. Additionally, in the embodiment described above, the rear camera 131 is provided on the bask surface of the main body 170 and the front camera 132 is provided on the front surface of the main body 170. However, a configuration is possible in which two rear cameras 131 are arranged at different positions on the back surface of the main body 170. In such a case, the imaging ranges of the two rear cameras 131 differ an amount corresponding to the difference in the positions at which the cameras are arranged, and a portion of the imaging ranges overlap.

In the embodiment described above, a situation is assumed in which the wearing target of the imaging device 100 is the wrist (arm) of the user, but the wearing target is not limited to the wrist of the user. Furthermore, the wearing target is not limited to the human body (head, torso, foot, or the like), and any object can be used as the wearing target, provided that the wearing target can block light from entering into the rear camera 131 or the illuminance sensor 141 by the imaging device 100 being worn on the wearing target. Examples thereof include pillars, walls, pipes, and the like.

Note that, in the embodiment described above, as the first condition used in the determination that the lens of the rear camera 131 is removed from the wearing target, the condition that the illuminance (the ambient brightness) detected by the illuminance sensor 141 exceeds the first threshold is used, but the first condition is not limited to such a condition. Any condition can be used as the first condition, provided that the condition is satisfied when the lens of the rear camera 131 is being worn on the wearing target by the wearing tool. For example, a configuration is possible in which the imaging device 100 includes a proximity sensor in place of or in addition to the illuminance sensor 141, and a condition that the proximity sensor detects that the wearing target is near is used as the first condition.

In the embodiment described above, as the second condition used in the determination that the lens of the rear camera 131 is removed from the wearing target, the condition that the belt that is the wearing tool is detected in the image captured by the rear camera 131 is used, but the second condition is not limited to such a condition. Any condition can be used as the second condition, provided that the condition is satisfied when the lens of the rear camera 131 is not being worn on the wearing target by the wearing tool. For example, a configuration is possible in which, in a case in which the rear camera 131 is an infrared camera (capable of angiography by performing close-up imaging of the skin), when the first condition is satisfied, the imaging parameters of the rear camera 131 are set for close-up imaging (macro imaging) as the first setting value, and a condition that "blood vessels are not imaged when close-up imaging is performed by the rear camera 131" is used as the second condition. Additionally, in this case, it is possible to set, as the second setting value, a setting value that sets the angle of view to a wide angle (an angle of view value greater than or equal to the wide angle reference angle of view value) in order to use the infrared camera removed from the wrist as a surveillance camera.

A configuration is possible in which, when the imaging device 100 continuously displays the time on the display 150 as in the case of a wristwatch, the time-keeping function is transitioned to a low power mode by stopping the display of the time on the display 150 or the like when a determination is made that the imaging device 100 is removed from the wrist. Additionally, a configuration is possible in which, when the imaging device 100 includes a pulse sensor, power saving is realized by stopping the pulse sensor when a determination is made that the imaging device 100 is removed from the wrist.

Note that, in the present embodiment, the bands 171, 172 as the wearing tool mount the main body 170 including the entire configuration of the imaging device 100 on the wearing target (the wrist), but a configuration is possible in which the imaging device 100 is not formed from a single main body 170. A configuration is possible in which the imaging device 100 is configured in a form divided into a plurality of housings and, in such a case, it is sufficient that the wearing tool mounts at least the lens of the rear camera 131 on the wearing target (for example, the wrist).

Modified Examples

Figure 6:
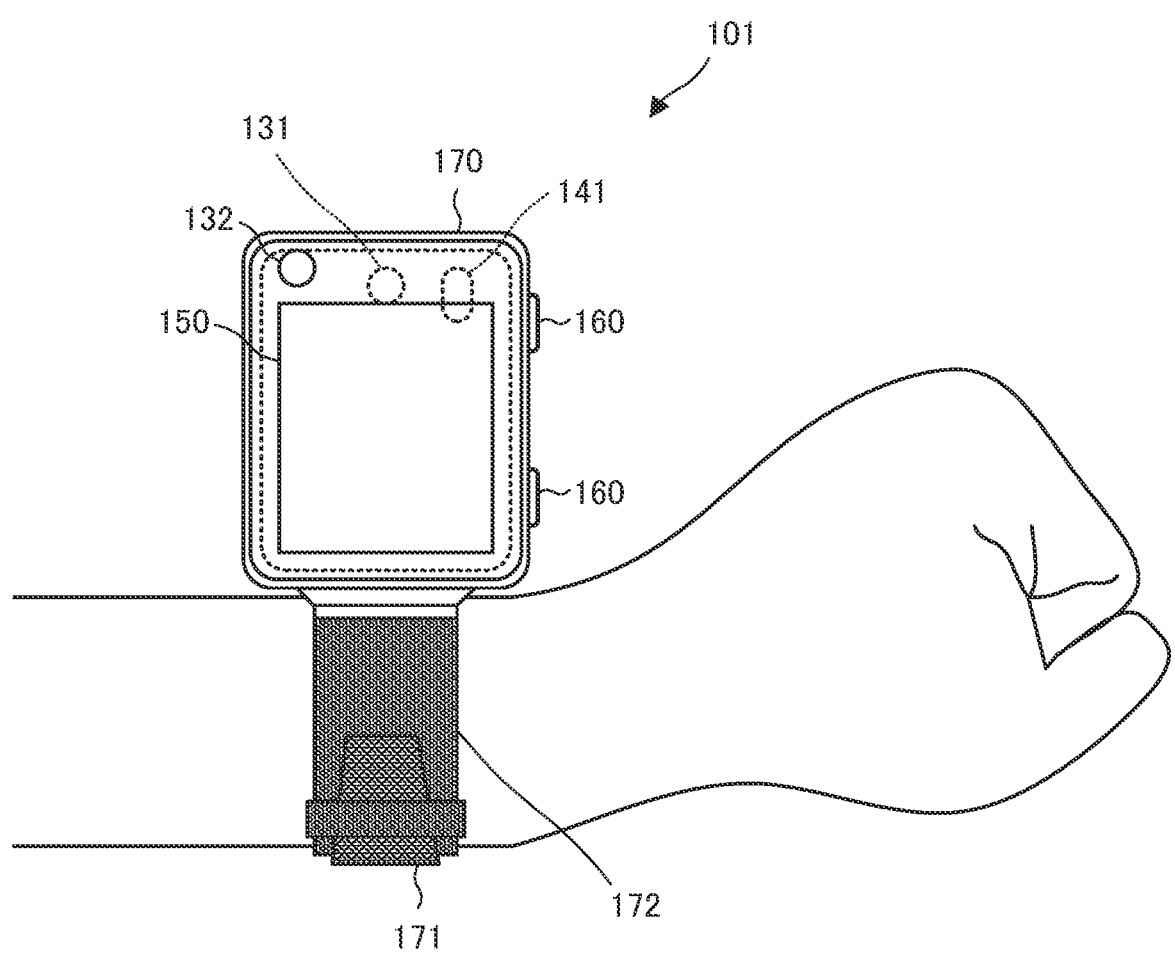
FIG. 6 is a drawing illustrating an imaging device according to a modified example, in a state in which a main body is raised.

As illustrated in FIG. 6, a modified example is possible in which, while an imaging device 101 is being worn on the wrist, an upper end of the main body 170 can be raised toward the user so as to enable imaging in front of the user, using the rear camera 131. Note that the rear camera 131 and the front camera 132 are provided near the upper end (the end to which the band 171 is connected) of the main body 170. Additionally, while not illustrated in FIG. 6, a hinge is provided on a lower end (the end to which the band 172 is connected) of the main body 170. The hinge has, as a rotational axis, a straight line that is perpendicular to a straight line connecting a midpoint of the upper end and a midpoint of the lower end of the main body 170, and that passes through the main body 170. The main body 170 is raised with this hinge as an axis.

That is, the lens of the rear camera 131 is connected to the band 172 via the hinge (movable member). Thus, in a state in which the lens of the rear camera 131 is being worn on the wrist by the bands 171, 172, the lens of the rear camera 131 is movable (rotatable), due to the hinge, between a position (first position) covered by the wrist and a position (second position) not covered by the wrist.

In a state in which the upper end of the main body 170 is raised, even though the imaging device 101 according to the modified example is being worn on the wrist, the imaging device 101 cannot detect, by the rear camera 131 and/or the illuminance sensor 141, that the imaging device 101 is being worn on the wrist. This is because, when the upper end of the main body 170 is raised, it is not possible to prevent light from entering (light is not blocked from entering) the rear camera 131 and the illuminance sensor 141 even though the imaging device 101 is being worn on the wrist and, as such, provided that the bands 171, 172 are not imaged using the rear camera 131, it is not possible to distinguish from when the imaging device 101 is not being worn on the wrist. However, in a state in which the main body 170 is not raised, the form of the imaging device 101 is exactly the same as the imaging device 100, and the same processing as the imaging control processing described above can be applied. Additionally, the feature of being able to make a determination that the imaging device 101 is removed from the wrist when the bands 171, 172 are imaged using the rear camera 131 is the same as described for the imaging device 100.

As such, in the imaging control processing of the imaging device 101 according to the modified example, in cases in which the bands 171, 172 are not imaged using the rear camera 131, the driving of the imaging element of the rear camera 131 is stopped when there is an acceleration change, the ambient brightness is low, and the like. This is because, when there is an acceleration change, blurring occurs in captured images and, when the ambient brightness is low, light levels are insufficient and normal imaging cannot be performed.

Thus, the imaging control processing according the modified example is processing obtained by partially modifying the imaging control processing illustrated in FIG. 4. The imaging control processing according to the modified example is described while referencing FIGS. 7 and 8. Note that, in the processing, the processing of FIG. 7 differs from that of FIG. 4 in that step S110 of FIG. 4 is replaced by step S120, step S121 of FIG. 8 is executed when a determination of No (A) is made in step S120, and step S111 is executed when returning (B) from the processing of FIG. 8. The other features of the processing of FIG. 7 are the same as the processing of FIG. 4 and, as such, the following discussion focuses on the different features.

Figure 7:
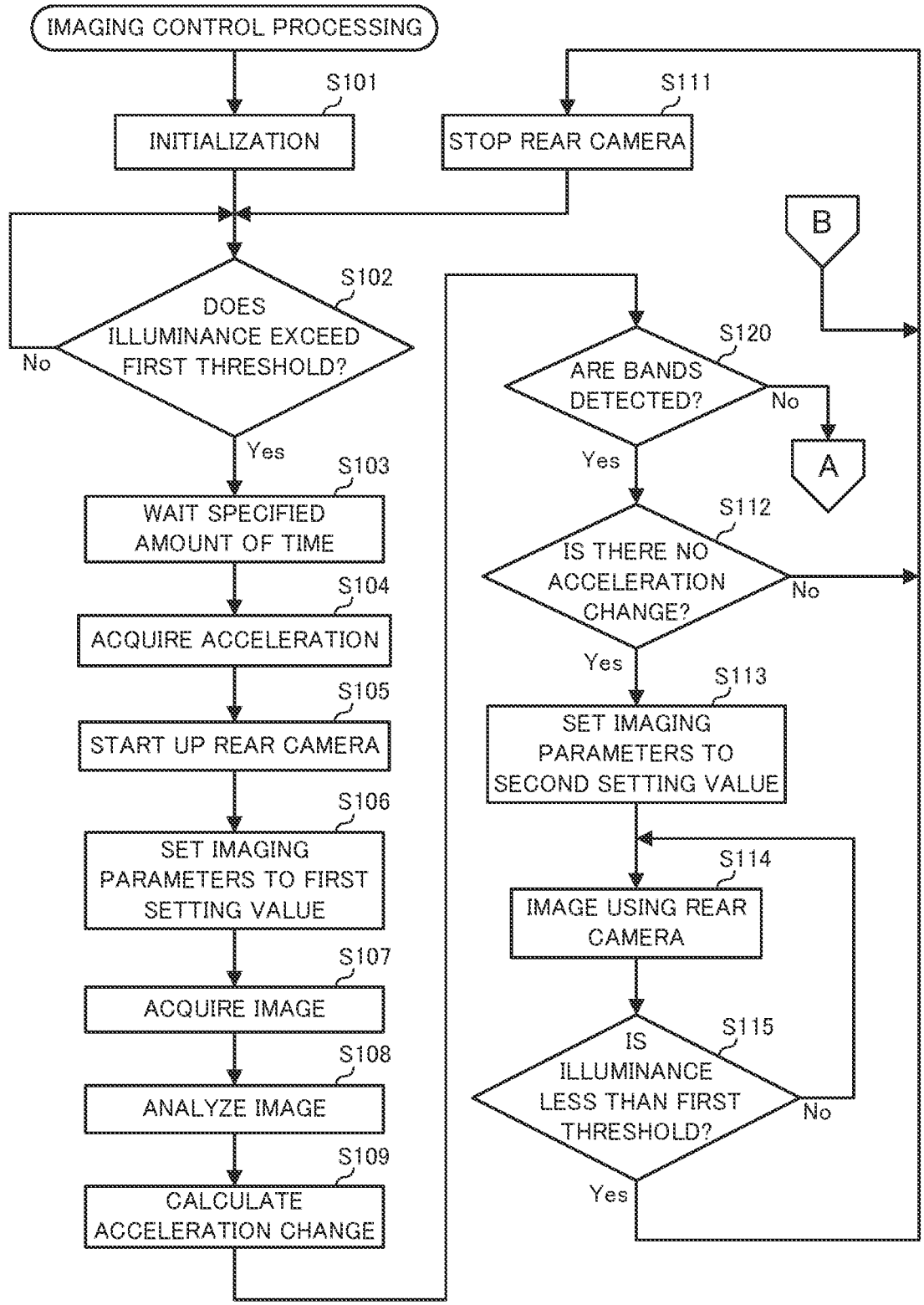
FIG. 7 is a first portion of a flowchart of imaging control processing according to the modified example.
Figure 8:
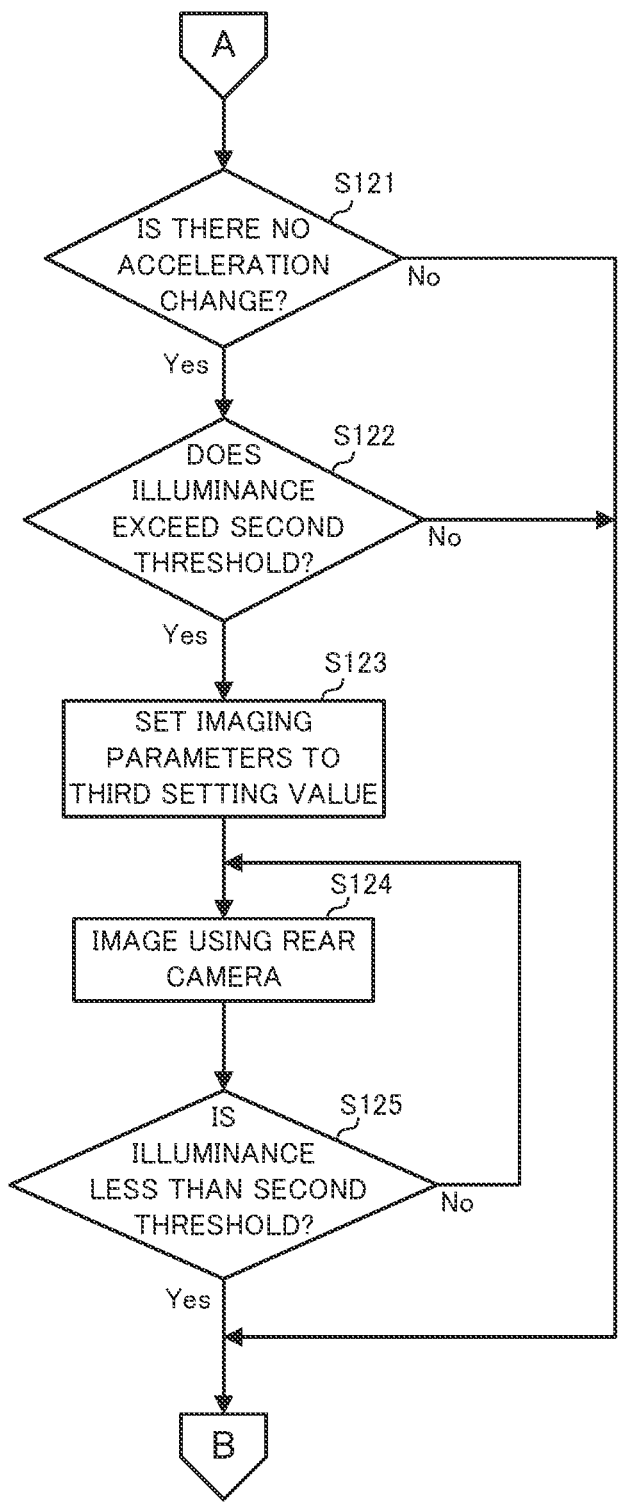
FIG. 8 is a second portion of the flowchart of the imaging control processing according to the modified example.

When a determination of No is made in step S120 of FIG. 7, the processor 110 determines whether there is no acceleration change, that is, whether the value of acceleration calculated in step S109 is less than an acceleration change threshold (step S121).

When the value of acceleration change exceeds the acceleration change threshold (step S121; No), the processing of step S111 of FIG. 7 is executed. Here, cases in which the imaging device 101 is being worn on and removed from the wrist are possible, but when the imaging device 101 is being worn on the wrist, a determination is made that the hand is moving while the main body 170 is raised, and when the imaging device is removed from the wrist, a determination is made that the user is carrying the imaging device 101 in a state in which the imaging device 101 is placed in a pocket, a bag, or the like. In either case, since there is an acceleration change, normal imaging is not possible (blurring occurs in the captured image) and, as such, the driving of the imaging element of the rear camera 131 is stopped in step S111.

When the value of acceleration change is less than the acceleration change threshold (step S121; Yes), the processor 110 determines whether a condition (third condition) that the illuminance (ambient brightness) detected by the illuminance sensor 141 exceeds a second threshold is satisfied (step S122). Note that this second threshold is a value defined as the minimum brightness at which it is possible to image a subject when the rear camera is set to a normal imaging mode (more precisely, when the imaging parameters of the rear camera 131 are set to a third setting value (described later)). Note that, as described above, the first threshold is a value defined as the minimum brightness at which it is possible to image the bands 171, 172 when the camera is set to the high sensitivity mode and, as such, the second threshold typically is a value greater than the first threshold, but may also be the same value as the first threshold.

When the illuminance is less than the second threshold (step S122; No), the processing of step S111 of FIG. 7 is executed. Here, cases are possible in which the imaging device 101 is being worn on the wrist (for example, a case in which the main body 170 is raised, a case in which a gap is formed between the imaging device 101 and the wrist and ambient light enters the illuminance sensor 141, and the like) and in which the imaging device 101 is removed from the wrist (for example, a case in which the bands 171, 172 are not imaged regardless of the imaging device 101 being removed from the wrist, such as when the user is holding the bands 171, 172 in a spread state). In a case in which the main body 170 is raised and in a case in which the user is holding the bands 171, 172 in a spread state, it is thought that step S123 may be executed without returning to step S111 and imaging may be performed. However, when a gap is formed between the imaging device 101 and the wrist and ambient light enters the illuminance sensor 141, it is preferable that imaging is not performed. Moreover, when the illuminance is less than the second threshold, the processor 110 cannot distinguish between these cases. As such, in the present modified example, since the light levels are insufficient and normal imaging cannot be performed in either case, step S111 is executed without distinguishing between these cases.

When the illuminance exceeds the second threshold (step S122; Yes), the processor 110 sets the imaging parameters of the rear camera 131 to the third setting value (step S123). The third setting value is a setting value defined on the basis of the content that the user desires to image using the rear camera 131 while the main body 170 is raised (for example, landscape imaging, surveillance imaging, or the like). A third setting value is selected that sets the angle of view to an angle of view other than the wide angle (for example, normal or telephoto), and the sensitivity to an optimal setting value corresponding to the ambient brightness. Note that the second setting value described above is a setting value for when the imaging device 101 is removed from the wrist and, as such, is a setting value that sets the frame rate lower than normal in order to reduce power consumption when being used as a surveillance camera. Meanwhile, the third setting value is thought to be used when the user raises the main body 170 or removes and holds the imaging device 101 with the bands 171, 172 in a spread state to actively perform imaging using the rear camera 131. Therefore, the third setting value is a setting value for imaging a landscape or the like, and is a setting value whereby the frame rate is set to normal.

Next, the processor 110 performs imaging using the rear camera 131 (step S124). In this step, imaging of content that the user desires to image using the rear camera 131, such as landscape imaging, surveillance imaging, or the like is performed while the main body 170 is in the raised state (or in a state in which the user removes the imaging device 101 from the wrist and holds the imaging device 101 while spreading the bands 171, 172).

Then, the processor 110 determines whether the illuminance (ambient brightness) detected by the illuminance sensor 141 is less than the second threshold (step S125). When the illuminance exceeds the second threshold (step S125; No), step S124 is executed.

When the illuminance is less than the second threshold (step S125; Yes), the processing of step S111 of FIG. 7 is executed. Here, cases are possible in which the main body 170 is pressed down while the imaging device 101 is being worn on the wrist, the imaging device 101 that is removed from the wrist and is being held by the user while spreading the bands 171, 172 is placed in a pocket, a bag, or the like, and the like but, in any case, step S111 is executed in the present modified example because the light levels are insufficient and normal imaging cannot be performed.

By carrying out the imaging control processing according to the modified example described above, the imaging device 101 can appropriately perform imaging in accordance with a condition based on the position of the rear camera 131. Specifically, when the first condition is satisfied due to a provisional determination being made that the imaging device 101 is removed from the wrist, the processor 110 sets the angle of view of the rear camera 131 to a wide angle, performs imaging, and attempts detection of the bands 171, 172. Then, when the bands 171, 172 are detected and, thus, the second condition is satisfied by confirming the determination that the imaging device 101 is removed from the wrist, the processor 110 sets imaging parameters such that landscape imaging, surveillance imaging, or the like can be performed using the rear camera 131.

Additionally, in a case in which the bands 171, 172 are not detected but the third condition is satisfied due to the illuminance detected by the illuminance sensor 141 exceeding the second threshold, a state in which the main body 170 is raised and a state in which the imaging device 101 is removed from the wrist and is being held by the user while spreading the bands 171, 172 are possible. As such, the processor 110 sets imaging parameters such that landscape imaging, surveillance imaging, or the like can be performed using the rear camera 131. In cases in which the second condition is satisfied, the bands 171, 172 are imaged when the angle of view of the rear camera 131 is set to the wide angle but, in cases in which the third condition is satisfied, the bands 171, 172 are not imaged even when the angle of view of the rear camera 131 is set to the wide angle. As such, the degree of freedom of the setting for the imaging parameters when the third condition is satisfied is greater than the degree of freedom of the setting for the imaging parameters when the second condition is satisfied.

With the imaging device 101, when the bands 171, 172 are not detected by the rear camera 131, the possibility that the main body 170 is in the raised state while the imaging device 101 is being worn on the wrist is considered. That is, when the acceleration change is less than the acceleration change threshold and the ambient brightness exceeds the second threshold, the processor 110 determines that the user has raised the main body 170 while wearing the imaging device 101. Moreover, in this case, the imaging parameters are set on the basis of the content that the user desires to image using the rear camera 131 in the state in which the main body 170 is raised. Accordingly, it is possible to raise the main body 170 while the imaging device 101 is being worn and perform imaging using the rear camera 131 by imaging parameters that the user desires.

Regardless of whether the main body 170 is raised and regardless of whether the imaging device 101 is being worn, the imaging device 101 cannot perform normal imaging when the ambient brightness is less than the second threshold. Accordingly, in such cases, the imaging device 101 can reduce power consumption by stopping the driving of the imaging element of the rear camera 131.

In the modified example described above, the rear camera 131 is controlled in the imaging control processing, but a configuration is possible in which the front camera 132 is also controlled. For example, a configuration is possible in which, when a determination is made that the imaging device 101 is being worn on the wrist and the main body 170 is not raised, a setting value (front first setting value) for imaging the face of the user, performing imaging for authentication, or the like is set, when a determination is made that the imaging device 101 is removed from the wrist, a setting value (front second setting value) for landscape imaging, surveillance imaging, or the like is set and, when a determination is made that the imaging device 101 is being worn on the wrist and the main body 170 is raised, a different setting value (front third setting value) for landscape imaging, surveillance imaging, or the like is set. For the front first setting value, as, for example, a setting value for self imaging, a setting value is possible that sets the angle of view of the front camera 132 to a wide angle (an angle of view value greater than or equal to the wide angle reference angle of view value; for example, an angle of view setting value whereby the front camera 132 is focused on the face when the front camera 132 is positioned in front of the face of the user) and the sensitivity to a middle sensitivity mode (since the image quality increases as the sensitivity is reduced, ISO sensitivity 400, for example). This setting value enables high quality imaging of the face of the user at a short distance.

Additionally, a setting value for authentication is possible for the first front setting value. Examples thereof include a setting value for iris authentication (a macro angle of view setting value whereby the front camera 132 is focused on the iris when the front camera 132 is positioned in front of an eyeball of the user), a setting value for face authentication (a setting value similar to the setting value for self imaging), a setting value for fingerprint authentication (a macro angle of view setting value whereby the front camera 132 is focused on a fingerprint when the front camera 132 is positioned in front of a finger or the like for fingerprint authentication), and the like. Examples of the front second setting value and the front third setting value include a setting value that sets the angle of view of the front camera 132 to telephoto (an angle of view less than the telephoto reference angle of view (for example, 30 degrees)) and the sensitivity to a middle sensitivity mode (ISO sensitivity 400, for example) to zoom in on a distant landscape and enable high quality imaging, a setting value that sets the angle of view of the front camera 132 to an ultra-wide angle of view (an angle of view value greater than or equal to an ultra-wide angle reference angle of view value (for example, 100 degrees)) and the sensitivity to a high sensitivity mode (for example, ISO sensitivity 3200) to perform surveillance, and the like.

To realize this, it is sufficient that, in steps S101 and S111 of the imaging control processing, processing is performed for setting the imaging parameters of the front camera 132 to the front first setting value (thereby setting the setting value for when imaging using the front camera 132 is performed by pressing the imaging button of the operator 160), in step S113, processing is performed for setting the imaging parameters of the front camera 132 to the front second setting value, in step S114, processing is performed for imaging using the front camera 132, in step S123, processing is performed for setting the imaging parameters of the front camera 132 to the front third setting value, and in step S124, processing is also performed for imaging using the front camera 132. As a result, the front camera 132 can appropriately perform imaging in accordance with a condition based on the position of the lens. For example, the front camera 132 is set to self imaging mode when the imaging device 101 is being worn on the wrist and the main body 170 is not raised, is set to landscape imaging mode when the main body 170 is raised, and is set to surveillance camera mode when removed from the wrist.

In the modified example described above, a hinge is used as the movable member, and the position of the lens of the rear camera 131 can be moved between a first position and a second position by rotating the main body 170 with the hinge as the rotational axis, but the movable member is not limited to a hinge. For example, a configuration such as a slide-type mobile phone device is possible in which the imaging device 101 includes, as the movable member, a slide mechanism that is capable of sliding the main body 170 in a predetermined direction (for example, in the direction in which the band 171 is connected).

In an imaging device 101 provided with the slide mechanism, the lens of the rear camera 131 is connected to the bands 171, 172 via the slide mechanism. Moreover, in a state in which the lens of the rear camera 131 is being worn on the wrist by the bands 171, 172, the lens can be moved, by the slide mechanism, between a first position (position covered by the wrist) and a second position (position not covered by the wrist). A position of the optical axis at the first position differs from a position of the optical axis at the second position.

Due to the "state in which the main body 170 is raised" of the imaging device 101 that uses the hinge described above being replaced with the "state in which the main body 170 is slid", the same imaging control processing described above for the imaging device 101 using the hinge can be applied. Specifically, it is thought that, when the first condition is satisfied, the lens of the rear camera 131 is in a state of being worn on the wrist and not slid, when the second condition is satisfied, the lens of the rear camera 131 is in a state of being removed from the wrist, when the third condition is satisfied, the lens of the rear camera 131 is in a state of being worn on the wrist and slid or in a state of being removed from the wrist and held by the user while the bands 171, 172 are spread. As such, the processor 110 can set imaging parameters suited to each state.

Note that the various functions of the imaging device 100, 101 can be implemented by a computer such as a typical personal computer (PC). Specifically, in the embodiment described above, examples are described in which programs, such as the imaging control processing, executed by the imaging device 100, 101 are stored in advance in the ROM of the storage 120. However, a computer may be configured that is capable of realizing these various features by storing and distributing the programs on a non-transitory computer-readable recording medium such as a compact disc read-only memory (CD-ROM), a digital versatile disc (DVD), a magneto-optical disc (MO), a memory card, and universal serial bus (USB) memory, and reading out and installing these programs on the computer.

Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the programs and, under the control of the operating system (OS), executing the programs in the same manner as other applications/programs.

Additionally, a configuration is possible in which the processor 110 is constituted by a desired processor unit such as a single processor, a multiprocessor, a multi-core processor, or the like, or by combining these desired processors with processing circuitry such as an application specific integrated circuit (ASIC), a field-programmable gate array (FPGA), or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An imaging device, comprising:
   a lens that guides, to an imaging element, light reflected from a subject;
   a wearing tool for placing at least the lens on a wearing target, wherein the wearing target is a human body part on which the wearing tool is worn;
   an illuminance sensor covered by the wearing target responsive to the lens being placed on the wearing target; and
   at least one processor, wherein
   the lens, responsive to being placed on the wearing target, is in a first position in which the lens is covered by the wearing target, and
   the processor,
      responsive to an illuminance detected by the illuminance sensor exceeding a first threshold, determines that a first condition is satisfied and sets an imaging parameter of at least one of the lens or the imaging element to a first setting value which is configured for imaging the wearing tool, and
      responsive to the wearing tool being captured in an image acquired by using the imaging parameter set to the first setting value, determines that a second condition is satisfied and sets the imaging parameter to a second setting value which is configured for imaging an object different from the wearing tool and at a different distance from the imaging element than the wearing tool.

2. The imaging device according to claim 1, wherein the second setting value is configured for imaging the object which is different from the wearing tool and further distant from the imaging element than the wearing tool.

3. The imaging device according to claim 1, wherein the processor, in a case in which the imaging element is activated, stops driving of the imaging element when the illuminance is less than the first threshold.

4. The imaging device according to claim 1, wherein
   the lens is connected to the wearing tool via a movable member,
   in a state in which the lens is placed on the wearing target by the wearing tool, the lens is movable, by the movable member, between the first position and a second position in which the lens is not covered by the wearing target, and
   the processor
      determines that a third condition is satisfied when the illuminance is greater than or equal to the first threshold, even when the wearing tool is not captured in the acquired image, and
      makes the imaging parameter for use when the first condition is satisfied different from the imaging parameter for use when the third condition is satisfied.

5. The imaging device according to claim 4, wherein the processor, in a case in which the imaging element is activated, stops driving of the imaging element when the third condition is no longer satisfied.

6. The imaging device according to claim 1, further comprising:
   an acceleration sensor, wherein
   the processor
      acquires an image by performing imaging using the lens and the imaging element in a state in which the imaging parameter is set to the first setting value,
      determines whether the wearing tool is captured in the acquired image, and whether an amount of change of acceleration detected by the acceleration sensor is less than an acceleration change threshold, and
      determines that the second condition is satisfied when the wearing tool is captured in the acquired image and the amount of change of acceleration is less than the acceleration change threshold.

7. The imaging device according to claim 1, wherein
   the lens and the imaging element are respectively a first lens and a first imaging element,
   the imaging device further comprises a second lens and a second imaging element having a different imaging range from the first lens and the first imaging element, and
   the processor makes an imaging parameter of at least one of the second lens or the second imaging element for use when the second condition is satisfied different from said imaging parameter for use when the second condition is not satisfied.

8. The imaging device according to claim 7, wherein when the second condition is satisfied, the processor sets said imaging parameter of at least one of the second lens or the second imaging element to be identical to the imaging parameter of at least one of the first lens or the first imaging element.

9. The imaging device according to claim 1, wherein the second condition includes a condition that the lens is not placed on the wearing target by the wearing tool.

10. The imaging device according to claim 9, wherein the lens is connected to the wearing tool via a movable member,
in a state in which the lens is placed on the wearing target by the wearing tool, the lens is movable, by the movable member, between the first position and a second position, the lens having different optical axes with respect to the wearing target in the first position and the second position,
the first condition includes that the lens is positioned in the first position, and
the second condition includes that the lens is positioned in the second position.

11. A control method for an imaging device, the imaging device including a lens that guides, to an imaging element, light reflected from a subject, a wearing tool for placing at least the lens on a wearing target, wherein the wearing target is a human body part on which the wearing tool is worn, an illuminance sensor covered by the wearing target when the lens is placed on the wearing target, and at least one processor, the method comprising:
determining, by the processor, that a first condition is satisfied when an illuminance detected by the illuminance sensor exceeds a first threshold to indicate that the lens is in a first position in which the lens is placed on the wearing target and is covered by the wearing target;
setting, by the processor, an imaging parameter of at least one of the lens or the imaging element to a first setting value which is configured for imaging the wearing tool;
determining, by the processor, that a second condition is satisfied when the wearing tool is captured in an image acquired by using the imaging parameter set to the first setting value; and
setting, by the processor, the imaging parameter to a second setting value which is configured for imaging an object different from the wearing tool and at a different distance from the imaging element than the wearing tool.

12. The control method according to claim 11, wherein the second setting value is configured for imaging the object which is different from the wearing tool and further distant from the imaging element than the wearing tool.

13. The control method according to claim 11, comprising:
in a case in which the imaging element is activated, stopping driving of the imaging element when the illuminance is less than the first threshold.

14. The control method according to claim 11, comprising:
determining that a third condition is satisfied when the illuminance exceeds a second threshold that is greater than or equal to the first threshold, even when the wearing tool is not captured in the acquired image, and making the imaging parameter for use when the first condition is satisfied different from the imaging parameter for use when the third condition is satisfied.

15. The control method according to claim 14, comprising:
in a case in which the imaging element is activated, stopping driving of the imaging element when the third condition is no longer satisfied.

16. The control method according to claim 11, comprising:
acquiring an image by performing imaging using the lens and the imaging element in a state in which the imaging parameter is set to the first setting value,
determining whether the wearing tool is captured in the acquired image, and whether an amount of change of acceleration of the imaging device is less than an acceleration change threshold, and
determining that the second condition is satisfied when the wearing tool is captured in the acquired image and the amount of change of acceleration is less than the acceleration change threshold.

17. The control method according to claim 11, wherein the lens and the imaging element are respectively a first lens and a first imaging element,
the imaging device further includes a second lens and a second imaging element having a different imaging range from the first lens and the first imaging element, and
an imaging parameter of at least one of the second lens or the second imaging element for use when the second condition is satisfied different from said imaging parameter for use when the second condition is not satisfied.

18. The control method according to claim 17, comprising:
when the second condition is satisfied, setting said imaging parameter of at least one of the second lens or the second imaging element to be identical to the imaging parameter of at least one of the first lens or the first imaging element.

19. The control method according to claim 11, wherein the second condition includes a condition that the lens is not placed on the wearing target by the wearing tool.

20. A non-transitory recording medium storing a program for execution in a computer of an imaging device, the imaging device including a lens that guides, to an imaging element, light reflected from a subject, a wearing tool for placing at least the lens on a wearing target, wherein the wearing target is a human body part on which the wearing tool is worn, an illuminance sensor covered by the wearing target when the lens is placed on the wearing target, and at least one processor, the program causing the computer to:
determine that a first condition is satisfied when an illuminance detected by the illuminance sensor exceeds a first threshold to indicate that the lens is in a first position in which the lens is placed on the wearing target and is covered by the wearing target;
set an imaging parameter of at least one of the lens or the imaging element to a first setting value which is configured for imaging the wearing tool;
determine that a second condition is satisfied when the wearing tool is captured in an image acquired by using the imaging parameter set to the first setting value; and
set the imaging parameter to a second setting value which is configured for imaging an object different from the wearing tool and at a different distance from the imaging element than the wearing tool.

* * * * *